US012146421B2

(12) United States Patent
Kling et al.

(10) Patent No.: US 12,146,421 B2
(45) Date of Patent: Nov. 19, 2024

(54) DEFORMABLE ROOT SPACER FOR A GAS TURBINE ENGINE ROTOR BLADE

(71) Applicant: Raytheon Technologies Corporation, Farmington, CT (US)

(72) Inventors: Colin J. Kling, Souderton, PA (US); Nicholas J. Lawliss, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/976,345

(22) Filed: Oct. 28, 2022

(65) Prior Publication Data

US 2024/0141794 A1 May 2, 2024

(51) Int. Cl.
*F01D 11/00* (2006.01)
*F01D 5/30* (2006.01)

(52) U.S. Cl.
CPC .............. *F01D 5/30* (2013.01); *F01D 11/008* (2013.01); *F05D 2220/32* (2013.01); *F05D 2240/80* (2013.01); *F05D 2250/70* (2013.01); *F05D 2300/514* (2013.01)

(58) Field of Classification Search
CPC ...... F01D 5/30; F01D 11/005; F05D 2220/32; F05D 2240/80; F05D 2250/70; F05D 2300/514
See application file for complete search history.

(56) References Cited

U.S. PATENT DOCUMENTS

| | | | | |
|---|---|---|---|---|
| 5,259,728 A * | 11/1993 | Szpunar | F04D 29/322 | 416/221 |
| 5,281,096 A * | 1/1994 | Harris | F01D 11/008 | 416/193 A |
| 5,622,476 A * | 4/1997 | Adde | F01D 5/323 | 416/221 |
| 7,108,484 B2 | 9/2006 | Thenaisie | | |
| 7,334,996 B2 | 2/2008 | Corbin | | |
| 8,845,294 B2 | 9/2014 | Belmonte | | |
| 8,851,854 B2 | 10/2014 | Alexander | | |
| 8,870,545 B2 | 10/2014 | Reghezza | | |
| 9,359,906 B2 | 6/2016 | Drozdenko | | |
| 9,422,819 B2 | 8/2016 | Drozdenko | | |
| 9,540,093 B2 | 1/2017 | Chatenet | | |
| 10,508,556 B2 | 12/2019 | Drozdenko | | |
| 2005/0207892 A1 | 9/2005 | Kanebako | | |

(Continued)

FOREIGN PATENT DOCUMENTS

| | | |
|---|---|---|
| EP | 2719865 A1 | 4/2014 |
| FR | 3082555 B1 | 4/2021 |

(Continued)

OTHER PUBLICATIONS

EP search report for EP23206768.6 dated Jan. 31, 2024.

*Primary Examiner* — David E Sosnowski
*Assistant Examiner* — Theodore C Ribadeneyra
(74) *Attorney, Agent, or Firm* — Getz Balich LLC

(57) ABSTRACT

A rotor assembly is provided that includes a rotor disk, a rotor blade and a rotor spacer. The rotor disk includes a slot. The rotor blade includes a blade root arranged within the slot. The root spacer is arranged within the slot between the rotor disk and the blade root. The root spacer is configured as or otherwise includes a cellular structure with a plurality of internal cells.

13 Claims, 12 Drawing Sheets

(56) References Cited

U.S. PATENT DOCUMENTS

| | | | | |
|---|---|---|---|---|
| 2009/0004017 | A1* | 1/2009 | Belmonte | F04D 29/666 416/241 R |
| 2011/0305576 | A1* | 12/2011 | Ward | F01D 5/3007 416/220 R |
| 2013/0156591 | A1* | 6/2013 | Alexander | F01D 5/3092 416/221 |
| 2015/0252678 | A1 | 9/2015 | Whitehurst | |
| 2016/0061040 | A1 | 3/2016 | Vest | |
| 2016/0237835 | A1 | 8/2016 | Drozdenko | |
| 2016/0237836 | A1* | 8/2016 | Harris | B22F 5/10 |
| 2016/0251972 | A1 | 9/2016 | Dierberger | |
| 2017/0218973 | A1* | 8/2017 | Bishop | F04D 29/34 |

FOREIGN PATENT DOCUMENTS

| | | | |
|---|---|---|---|
| FR | 3121171 | B1 | 4/2023 |
| FR | 3120389 | B1 | 6/2023 |

* cited by examiner

DEFORMABLE ROOT SPACER FOR A GAS TURBINE ENGINE ROTOR BLADE

BACKGROUND OF THE DISCLOSURE

1. Technical Field

This disclosure relates generally to a gas turbine engine and, more particularly, to a root spacer for arranging between a rotor disk and a root of a rotor blade.

2. Background Information

A fan rotor for a typical turbofan gas turbine engine includes a plurality of fan blades arranged circumferentially around a rotor disk. Each fan blade may include an airfoil connected to a dovetail root. The root is inserted into a respective dovetail slot within the rotor disk to connect the fan blade to the rotor disk. A radial height of the root is typically less than a radial height of the slot to facilitate fan blade assembly with the rotor disk. A gap may therefore extend between a radial inner surface of the root and a radial inner surface of the slot. Such a gap is typically filled with a root spacer, which is sometimes also referred to as a fan blade spacer. Various types and configurations of root spacers are known in the art. While these known root spacers have various benefits, there is still room in the art for improvement.

SUMMARY OF THE DISCLOSURE

According to an aspect of the present disclosure, a rotor assembly is provided that includes a rotor disk, a rotor blade and a rotor spacer. The rotor disk includes a slot. The rotor blade includes a blade root arranged within the slot. The root spacer is arranged within the slot between the rotor disk and the blade root. The root spacer is configured as or otherwise includes a cellular structure with a plurality of internal cells.

According to another aspect of the present disclosure, another rotor assembly is provided that includes a rotor disk, a rotor blade and a rotor spacer. The rotor disk includes a slot. The rotor blade includes a blade root arranged within the slot. The root spacer is arranged within the slot radially between the rotor disk and the blade root. The root spacer is configured with a plurality of apertures in the root spacer. A first of the apertures has a lateral width that is less than a radial thickness of the root spacer at the first of the apertures.

According to still another aspect of the present disclosure, another rotor assembly is provided that includes a rotor disk, a rotor blade and a rotor spacer. The rotor disk includes a slot. The rotor disk is configured to rotate about an axis. The rotor blade includes a blade root arranged within the slot. The root spacer is arranged within the slot between the rotor disk and the blade root. The root spacer has a corrugated geometry in a reference plane perpendicular to the axis.

The slot may extend longitudinally into the rotor disk from an axial side of the rotor disk. The root spacer may include a plurality of longitudinally extending corrugations.

The first of the apertures may include a cavity embedded within the root spacer.

The root spacer may include a cellular core forming the plurality of apertures.

The internal cells may include a plurality of closed cells.

The internal cells may include a plurality of open cells.

The cellular structure may be formed from a porous material. The internal cells may include a plurality of pores within the porous material.

The cellular structure may include: a first sidewall engaging the blade root; a second sidewall engaging the rotor disk; and a cellular core between and connected to the first sidewall and the second sidewall.

The cellular core may include a plurality of core elements extending between the first sidewall and the second sidewall.

A first of the core elements may be configured as or otherwise include a column.

A first of the core elements may be configured as or otherwise include a rail.

The cellular core may be configured as or otherwise include a honeycomb core.

The first sidewall may be non-perforated. An addition or alternatively, the second sidewall may be non-perforated.

A first portion of the cellular structure may have a first porosity. A second portion of the cellular structure may have a second porosity that is different than the first porosity.

The root spacer may be radially between the rotor disk and the blade root. The root spacer may have a radial thickness at a first of the internal cells. The first of the internal cells may have a lateral width that is less than the radial thickness.

The root spacer may be radially between the rotor disk and the blade root. A first of the internal cells may have a radial height and a lateral width that is less than the radial height.

The rotor blade may be configured as a gas turbine engine fan blade.

The slot may be one of a plurality of slots that extend longitudinally into the rotor disk. The rotor blade may be one of a plurality of rotor blades that are arranged circumferentially around an axis. Each of the rotor blades may include a respective blade root that is arranged within a respective one of the slots. The root spacer may be one of a plurality of root spacers. Each of the root spacers may be arranged within a respective one of the slots between the rotor disk and a respective one of the blade roots.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
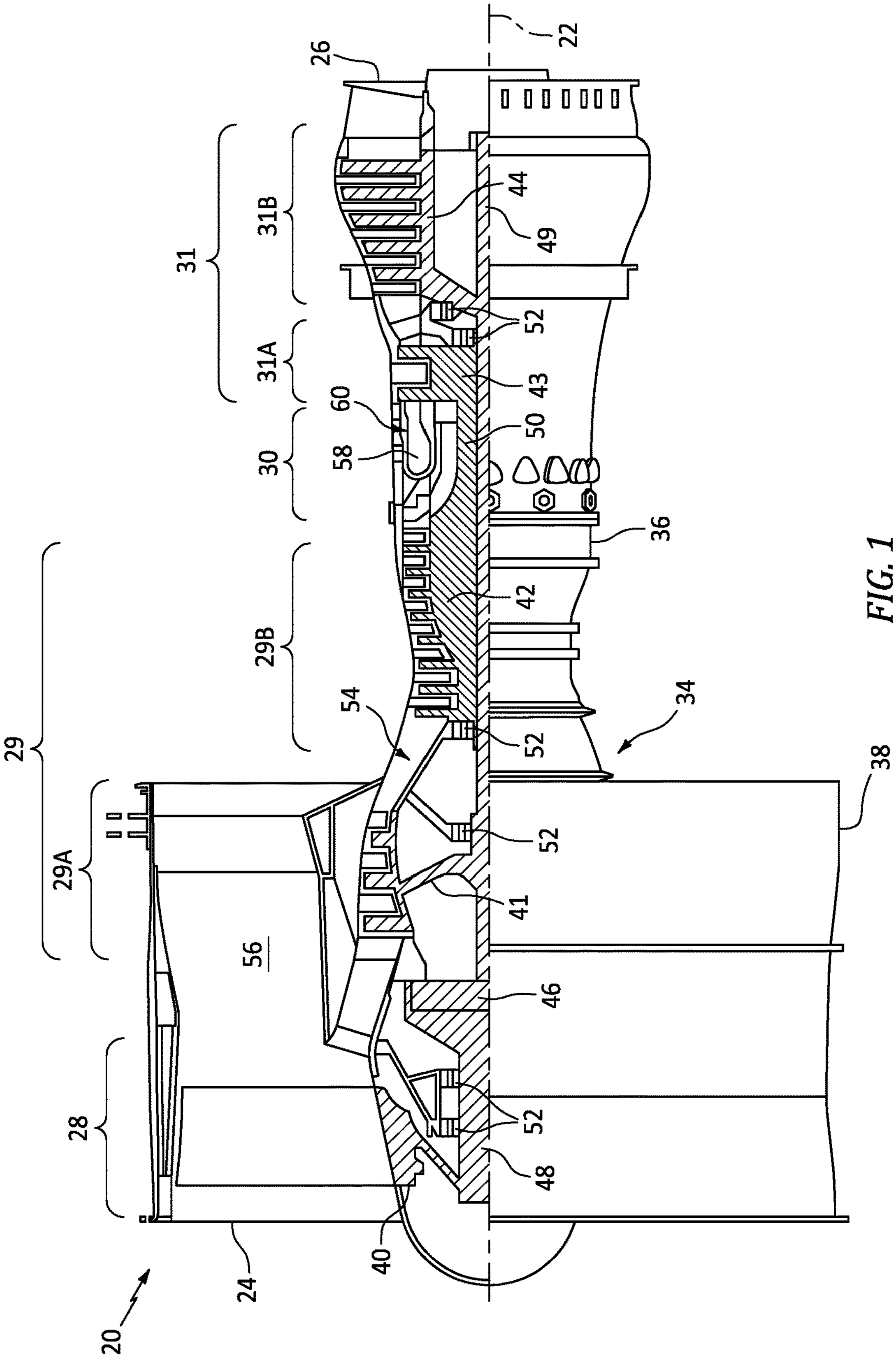
FIG. 1 is a side cutaway illustration of a geared gas turbine engine.

FIG. 1 is a side cutaway illustration of a geared gas turbine engine 20. This gas turbine engine 20 extends along an axial centerline 22 between an upstream airflow inlet 24 and a downstream exhaust 26. The gas turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., a core of the gas turbine engine 20. The outer case 38 may house at least the fan section 28.

Each of the engine sections 28, 29A, 29B, 31A and 31B includes a respective bladed rotor 40-44. Each of these bladed rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a geartrain 46, for example, through a fan shaft 48. The geartrain 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During operation, air enters the gas turbine engine 20 through the airflow inlet 24. This air is directed through the fan section 28 and into a core flowpath 54 and a bypass flowpath 56. The core flowpath 54 extends sequentially through the engine sections 29A-31B; e.g., the engine core. The air within the core flowpath 54 may be referred to as "core air". The bypass flowpath 56 extends through a bypass duct, which bypass flowpath 56 bypasses (e.g., extends outboard of) the engine core. The air within the bypass flowpath 56 may be referred to as "bypass air".

The core air is compressed by the LPC rotor 41 and the HPC rotor 42 and directed into a (e.g., annular) combustion chamber 58 of a (e.g., annular) combustor 60 in the combustor section 30. Fuel is injected into the combustion chamber 58 through one or more fuel injectors and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from an inlet to the core flowpath 54. The rotation of the LPT rotor 44 also drives rotation of the fan rotor 40, which propels bypass air through and out of the bypass flowpath 56. The propulsion of the bypass air may account for a majority of thrust generated by the gas turbine engine 20, e.g., more than seventy-five percent (75%) of engine thrust. The gas turbine engine 20 of the present disclosure, however, is not limited to the foregoing exemplary thrust ratio.

Figure 2:
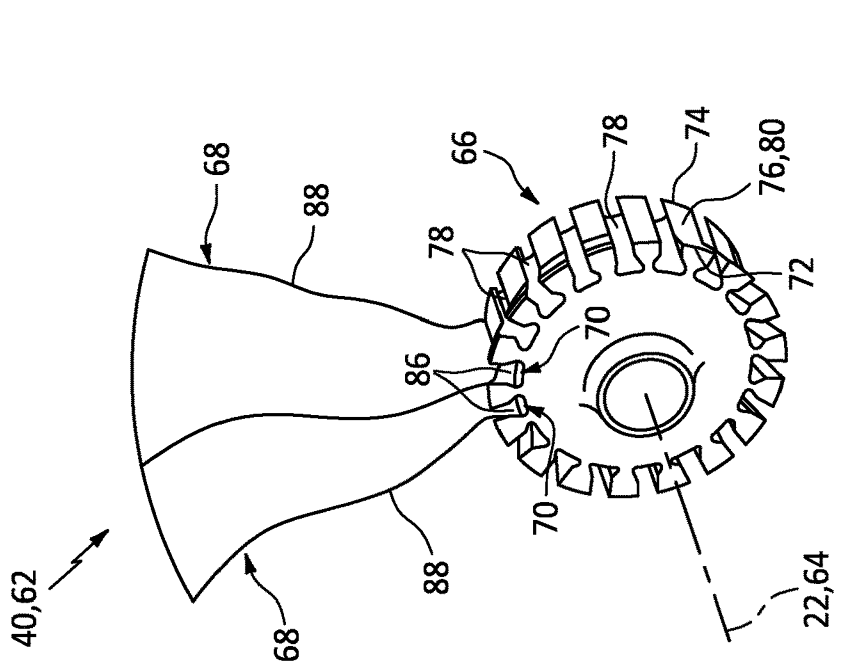
FIG. 2 is a perspective illustration of a partially assembled rotor assembly.

FIG. 2 is a perspective illustration of a partially assembled rotor assembly 62 for one of the above bladed rotors; e.g., the fan rotor 40. This rotor assembly 62 is configured to rotate about a rotational axis 64, which rotational axis 64 may be parallel with (e.g., coaxial with) the axial centerline 22. The rotor assembly 62 of FIG. 2 includes a rotor disk 66, one or more rotor blades 68 (e.g., fan blades) and one or more root spacers 70 (e.g., fan blade spacers).

The rotor disk 66 extends axially along the rotational axis 64 between and to a forward, upstream side 72 of the rotor disk 66 and an aft, downstream side 74 of the rotor disk 66. The rotor disk 66 extends radially out to a distal, outer side 76 of the rotor disk 66. The rotor disk 66 extends circumferentially around the rotational axis 64, which provides the rotor disk 66 of FIG. 2 with an annular body.

Figure 3:
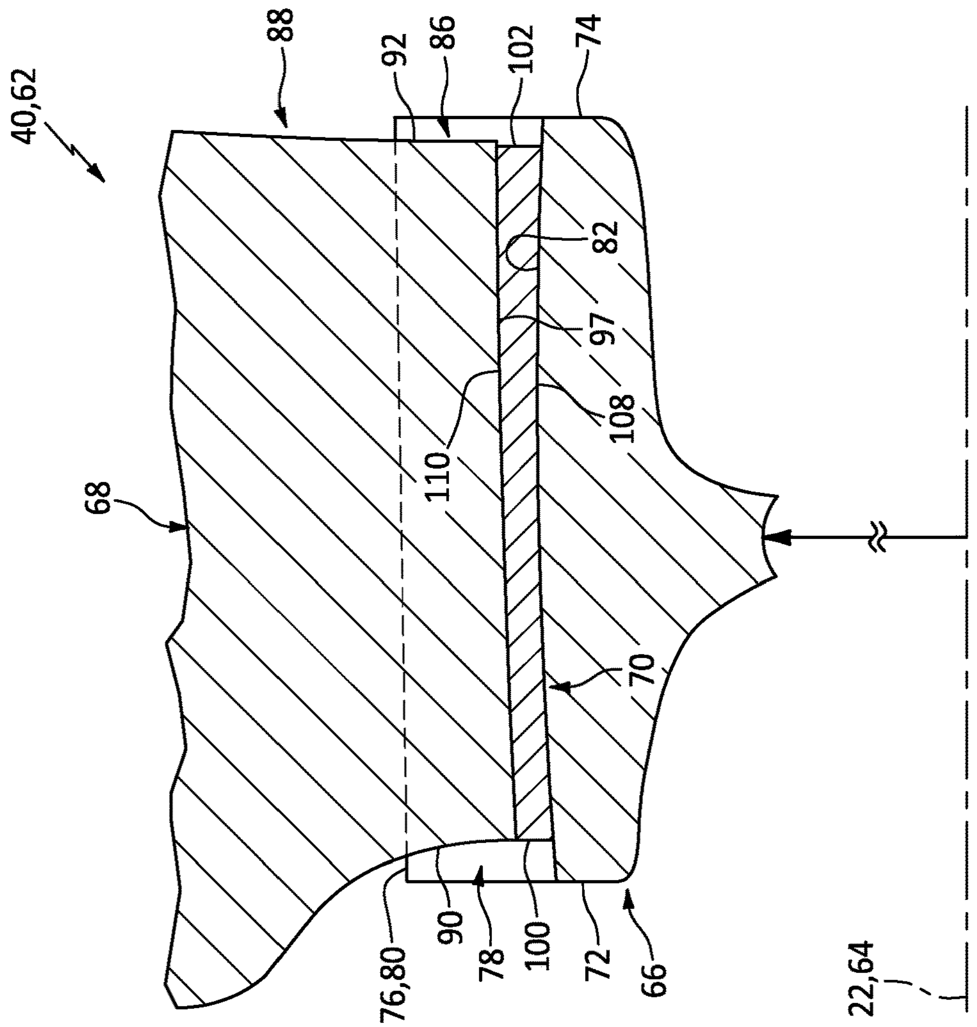
FIG. 3 is a side sectional illustration of a portion of the rotor assembly.
Figure 4:
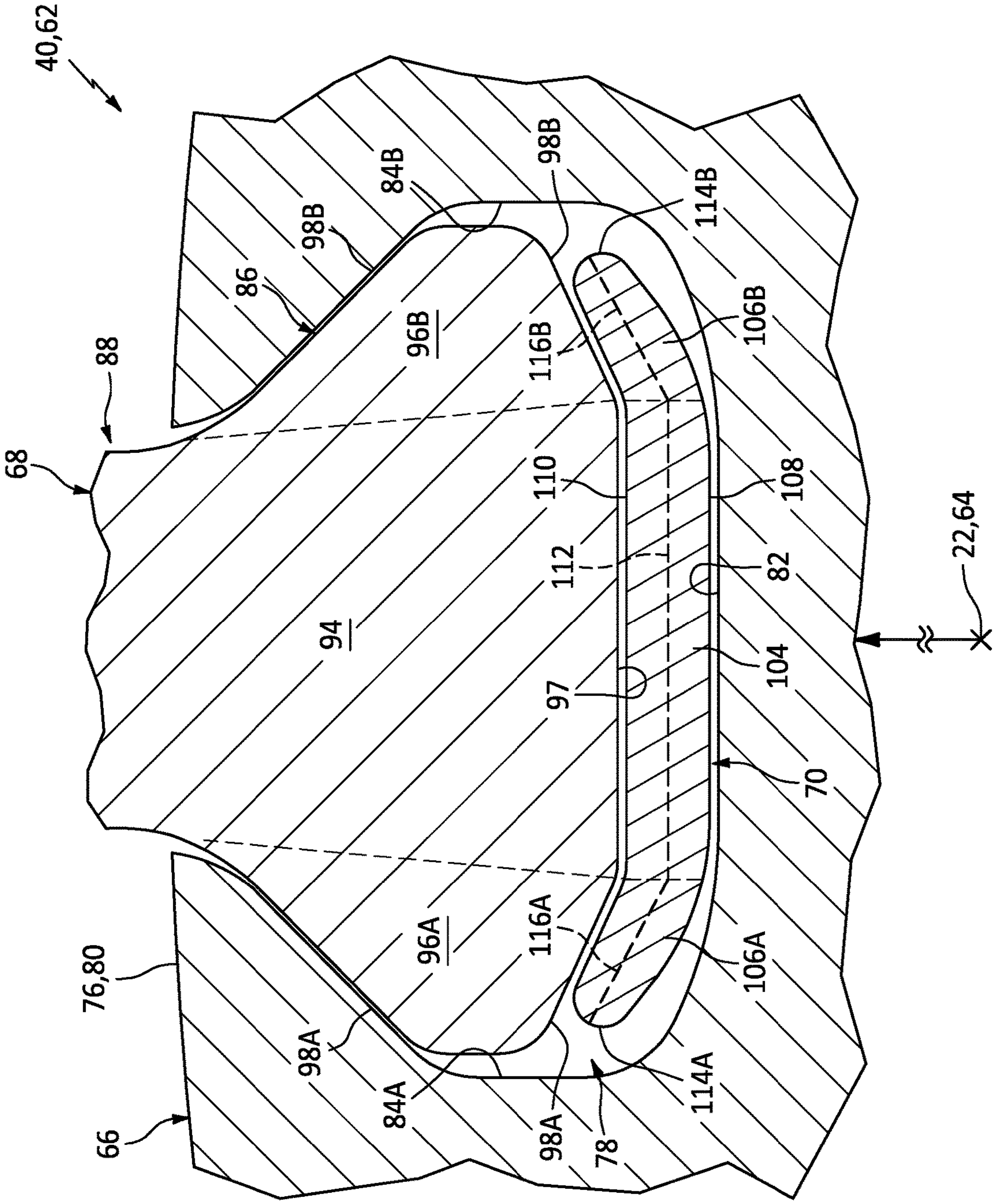
FIG. 4 is a cross-sectional illustration of a portion of the rotor assembly.

The rotor disk 66 includes one or more blade root slots 78 (e.g., dovetail slots) arranged circumferentially about the rotational axis 64 in an array. Referring to FIG. 3, each of the root slots 78 each extends longitudinally (e.g., generally axially) into the rotor disk 66 from one or both of the disk sides 72 and 74. Each root slot 78 of FIG. 3, for example, extends longitudinally through the rotor disk 66 between and to the disk upstream side 72 and the disk downstream side 74. Referring to FIG. 4, each of the root slots 78 extends radially into the rotor disk 66 from an (e.g., segmented) outer surface 80 of the rotor disk 66 at the disk outer side 76 to a respective slot base surface 82 of the rotor disk 66. Each of the root slots 78 extends laterally (e.g., circumferentially) between a respective set of opposing slot side surfaces 84A and 84B (generally referred to as "84") of the rotor disk 66, where the respective slot base surface 82 may extend laterally between and to the slot side surfaces 84.

Referring to FIG. 3, each of the rotor blades 68 includes a blade root 86 and a blade airfoil 88; see also FIG. 2. The blade root 86 extends longitudinally between a forward, upstream end 90 of the blade root 86 and an aft, downstream end 92 of the blade root 86. Referring to FIG. 4, the blade root 86 may include a root base portion 94 and a pair of root side portions 96A and 96B (generally referred to as "96"). The root base portion 94 extends radially between and to the blade airfoil 88 and a root base surface 97 of the blade root 86. The root side portions 96A and 96B respectively extend laterally out from the root base portion 94 to opposing root side surfaces 98A and 98B (generally referred to as "98") of the blade root 86, where the root base surface 97 may extend laterally between and to the root side surfaces 98.

Figure 5:
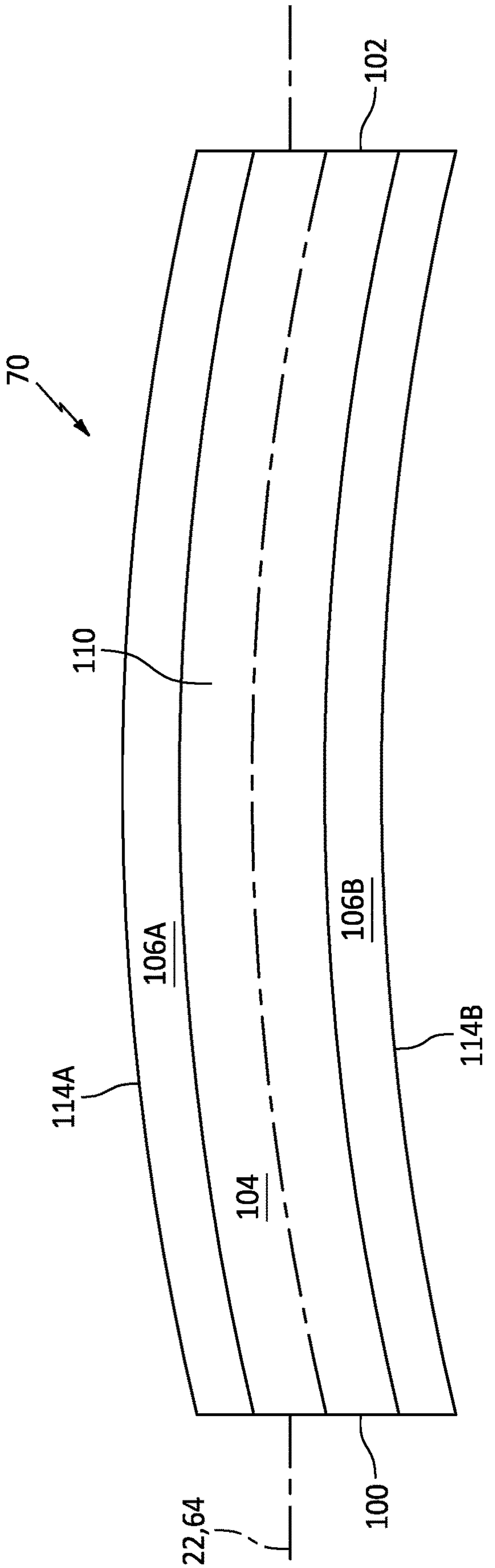
FIG. 5 is a top view illustration of a root spacer.

Referring to FIG. 5, each of the root spacers 70 extends longitudinally between and to a forward upstream end 100 of the root spacer 70 and an aft, downstream end 102 of the root spacer 70. The root spacer 70 of FIG. 5 includes a spacer base portion 104 and one or more spacer side portions 106A and 106B (generally referred to as "106"). Referring to FIG. 4, each of the spacer portions 104 and 106 extends radially between an inner surface 108 of the root spacer 70 and an outer surface 110 of the root spacer 70. The spacer base portion 104 extends laterally between the spacer side portions 106. The spacer base portion 104 has a lateral base portion chord 112. The spacer side portions 106 respectively extend laterally out from the spacer base portion 104 to opposing sides 114A and 114B (generally referred to as "114") of the root spacer 70. Each of the spacer side portions 106A, 106B has a respective lateral side portion chord 116A, 116B (generally referred to as "116"). Each side portion chord 116 may be angularly offset from the base portion chord 112 by an obtuse angle; e.g., between one-hundred and thirty-five degrees (135°) and one-hundred and sixty degrees (160°). The present disclosure, however, is not limited to such an exemplary arrangement.

Referring to FIG. 2, the rotor blades 68 are arranged circumferentially around the rotational axis 64 in an array. The blade roots 86 and the root spacers 70 are respectively arranged within the root slots 78. Referring to FIG. 3, the spacer upstream end 100 and the root upstream end 90 may be substantially longitudinally aligned and arranged at (e.g., on, adjacent or proximate) the disk upstream side 72. The spacer downstream end 102 and the root downstream end 92 may be substantially longitudinally aligned and arranged at the disk downstream side 74. Referring to FIG. 4, the root side portions 106 extend laterally between the root base portion 94 and the rotor disk 66. The root side surfaces 98A and 98B are configured to respectively engage (e.g., contact) the slot side surfaces 84A and 84B; e.g., when the gas turbine engine 20 is operational. The root spacer 70 is arranged radially between the blade root 86 and the rotor disk 66. The spacer outer surface 110 may engage one or more of the root surfaces 97, 98A and/or 98B; e.g., when the gas turbine engine 20 is operational as well as non-operational. The spacer inner surface 108 may engage the slot base surface 82; e.g., when the gas turbine engine 20 is non-operational. With this arrangement, each root spacer 70 may maintain the respective rotor blade 68 in a certain location and/or orientation when the gas turbine engine 20 is non-operational such that, for example, the rotor blade 68 does not pitch to its side.

Figure 6:
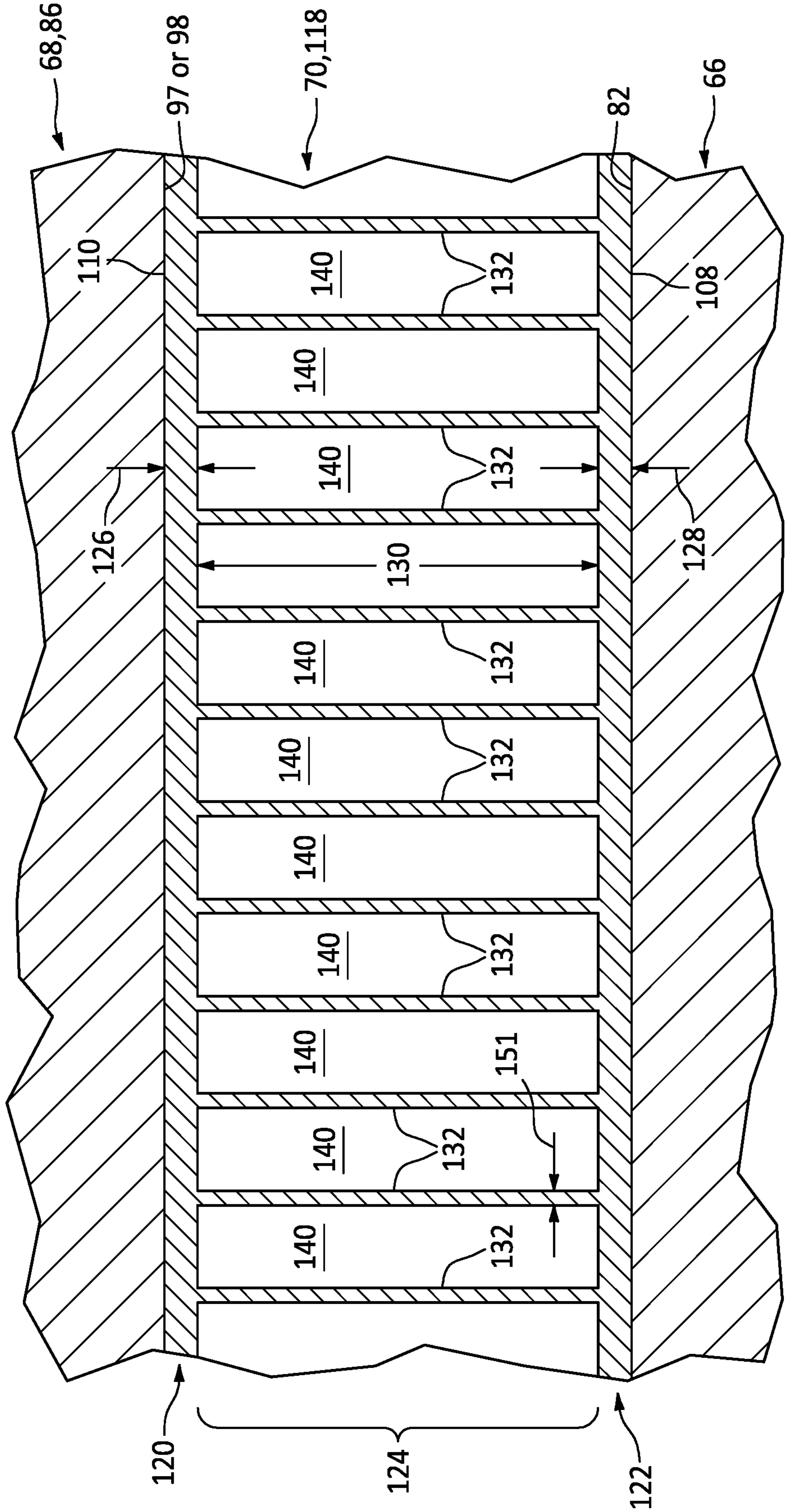
FIG. 6 is a sectional illustration of a portion of the root spacer between a rotor disk and a root of a rotor blade.

Referring to FIG. 6, each of the root spacers 70 may be configured from or otherwise include a cellular structure 118. The cellular structure 118 of FIG. 6 includes an outer sidewall 120, an inner sidewall 122 and a cellular core 124.

The outer sidewall 120 may be configured from or otherwise include a solid layer of material; e.g., a non-perforated, non-porous layer of material. This outer sidewall 120 at least partially or completely forms the spacer outer surface 110. The outer sidewall 120 has a radial thickness 126.

The inner sidewall 122 may be configured from or otherwise include a solid layer of material; e.g., a non-perforated, non-porous layer of material. This inner sidewall 122 at least partially or completely forms the spacer inner surface 108. The inner sidewall 122 has a radial thickness 128 that may be equal to or different (e.g., greater or less) than the outer sidewall thickness 126.

The cellular core 124 is arranged radially between the outer sidewall 120 and the inner sidewall 122. The cellular core 124 of FIG. 6, for example, extends radially between and to the outer sidewall 120 and the inner sidewall 122. The cellular core 124 has a radial thickness 130. This cellular core thickness 130 may be (e.g., between 2× and 20×) greater than the outer sidewall thickness 126 and/or the inner sidewall thickness 128. The cellular core thickness 130, for example, may be at least 2×, 4×, 6×, 8× or 10× the outer sidewall thickness 126 and/or the inner sidewall thickness 128. The present disclosure, however, is not limited to such an exemplary arrangement. Furthermore, while the cellular core thickness 130 may be uniform (e.g., constant) laterally and/or longitudinally across the root spacer 70 and its cellular core 124, the cellular core thickness 130 may alternatively continuously or incrementally change (e.g., increase, decrease and/or undulate) laterally and/or longitudinally across the root spacer 70 and its cellular core 124. The cellular core thickness 130, for example, may be locally sized to tailor a root spacer impact response.

The cellular core 124 is connected to the outer sidewall 120 and the inner sidewall 122. The cellular core 124, for example, may be formed integral with the outer sidewall 120 and/or the inner sidewall 122 using additive manufacturing, casting, and/or other manufacturing techniques. With such a configuration, the cellular core 124 and, more broadly, the root spacer 70 may be formed as a single monolithic body. In another example, the cellular core 124 is formed discrete from and then bonded and/or otherwise attached to the outer sidewall 120 and/or the inner sidewall 122.

The cellular structure 118 and its cellular core 124 and, more generally, the root spacer 70 are configured to elastically (e.g., temporarily) and/or plastically (e.g., permanently) deform under certain conditions. The cellular structure 118 and its cellular core 124, for example, may be configured to deform when the rotor blade 68 exerts more than a threshold load onto the root spacer 70. This threshold load may be selected to be, for example, slightly (e.g., by a safety factor) less than an impact load that may be exerted when the rotor blade 68 comes into contact with a relatively large foreign object; e.g., a relatively large bird. With such an arrangement, the root spacer 70 may operate as a damper for the rotor blade 68 thereby reducing or eliminating impact related damage (e.g., foreign object damage (FOD)) to the rotor blade 68. The deformation of the cellular structure 118 and its cellular core 124, for example, may facilitate controlled pitching, pivoting and/or other movement of the impacted rotor blade 68 relative to the rotor disk 66.

Figure 7A:
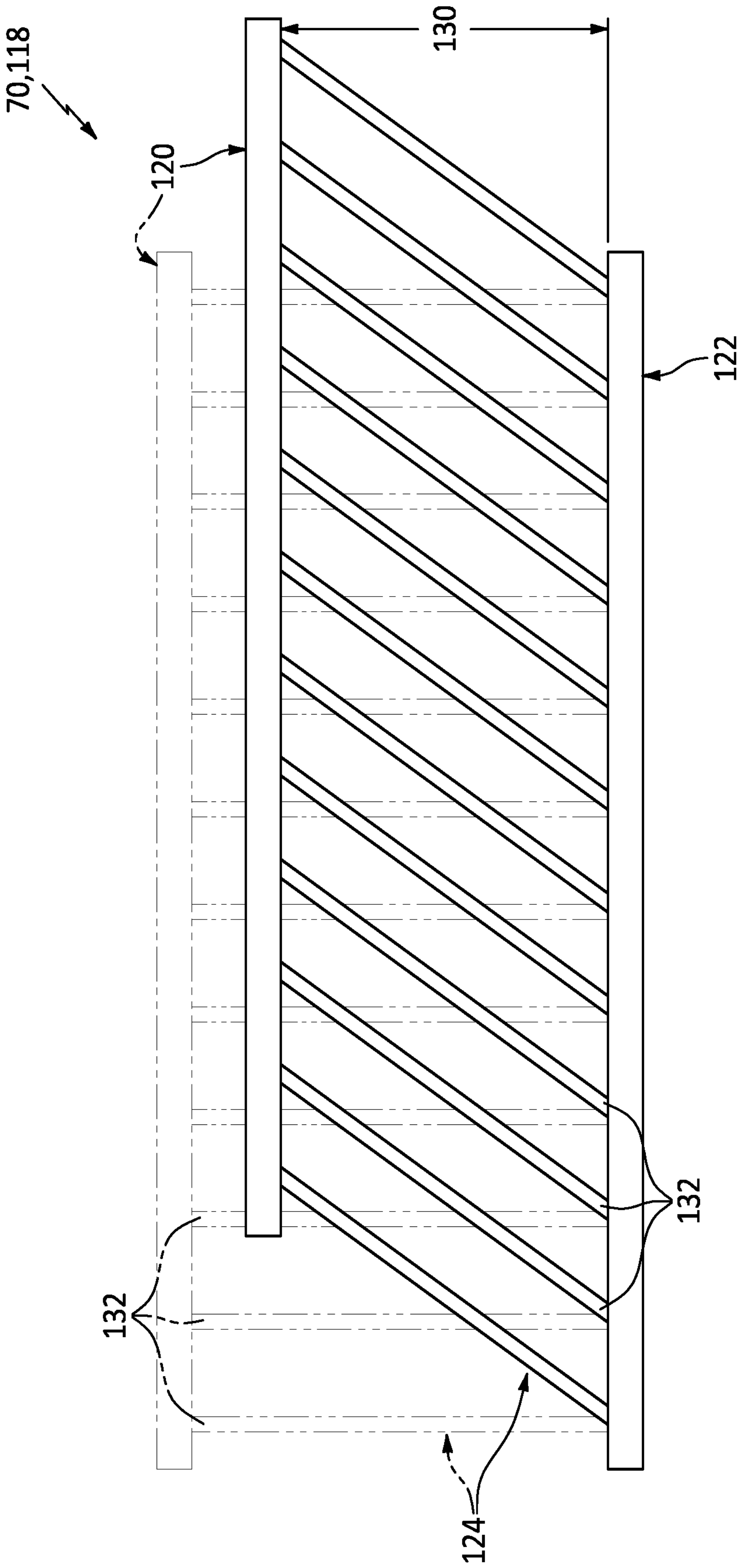
FIGS. 7A and 7B are illustrations of the root spacer depicting different types of deformation.
Figure 7B:
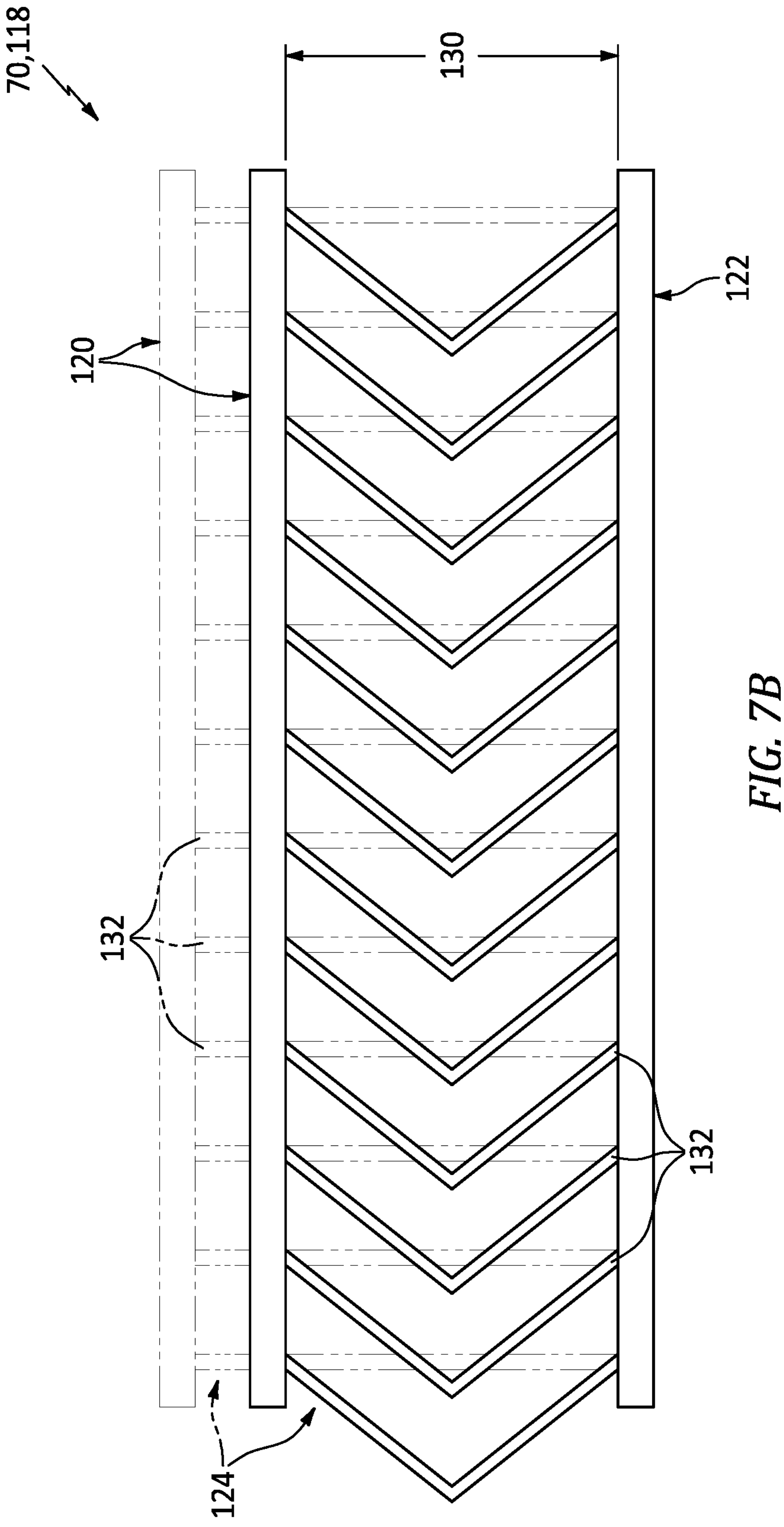

The cellular core 124 of FIG. 6 includes an array of core elements 132; e.g., radially members. Referring to FIGS. 7A and 7B, one or more or all of these core elements 132 is configured to deform such that a value of the cellular core thickness 130 decreases under certain conditions; e.g., during a bird strike. With such deformation, the outer sidewall 120 and the inner sidewall 122 may move radially towards one another; e.g., the outer sidewall 120 may move radially inwards. The cellular structure 118, more particularly, may be compressed locally in one or more discrete regions, or globally such that the entire cellular structure 118 is compressed. Examples of core element deformation include, but are not limited to, bending, buckling and compressing. This deformation may occur elastically and/or plastically. It is also contemplated the deformation may (or may not) result in fracturing, shearing, snapping and/or otherwise breaking members (e.g., 120, 122 and/or 132) of the cellular structure 118.

Figure 8B:
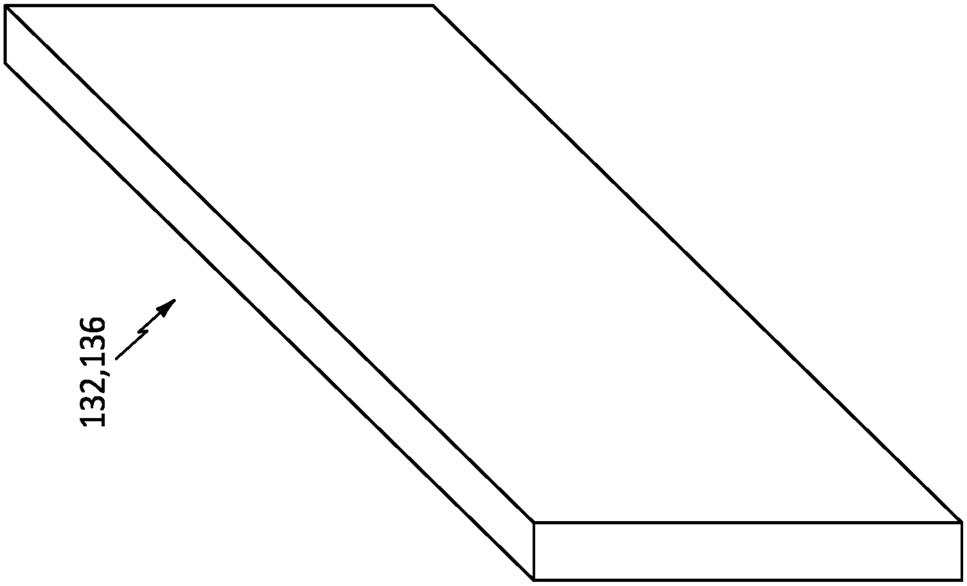
FIGS. 8A and 8B are illustrations of a core element with various different configurations.
Figure 8A:
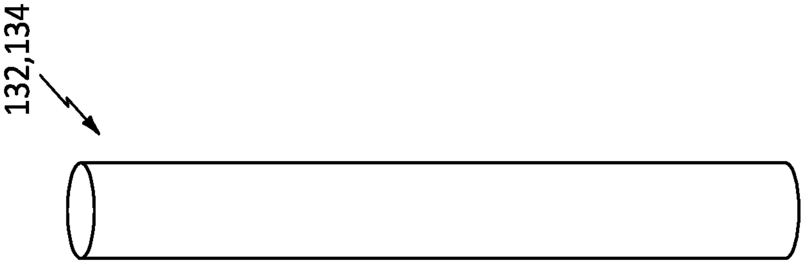
Figure 9B:
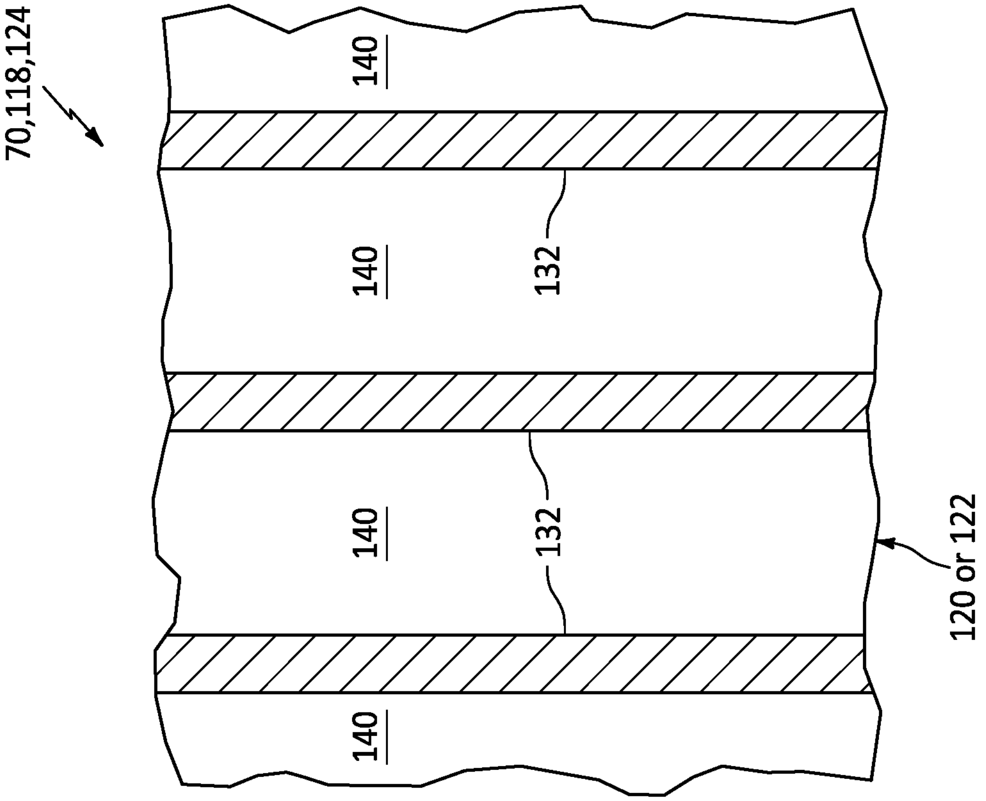
FIGS. 9A-9C are sectional illustrations of a portion of the root spacer with various different core element arrangements.
Figure 9A:
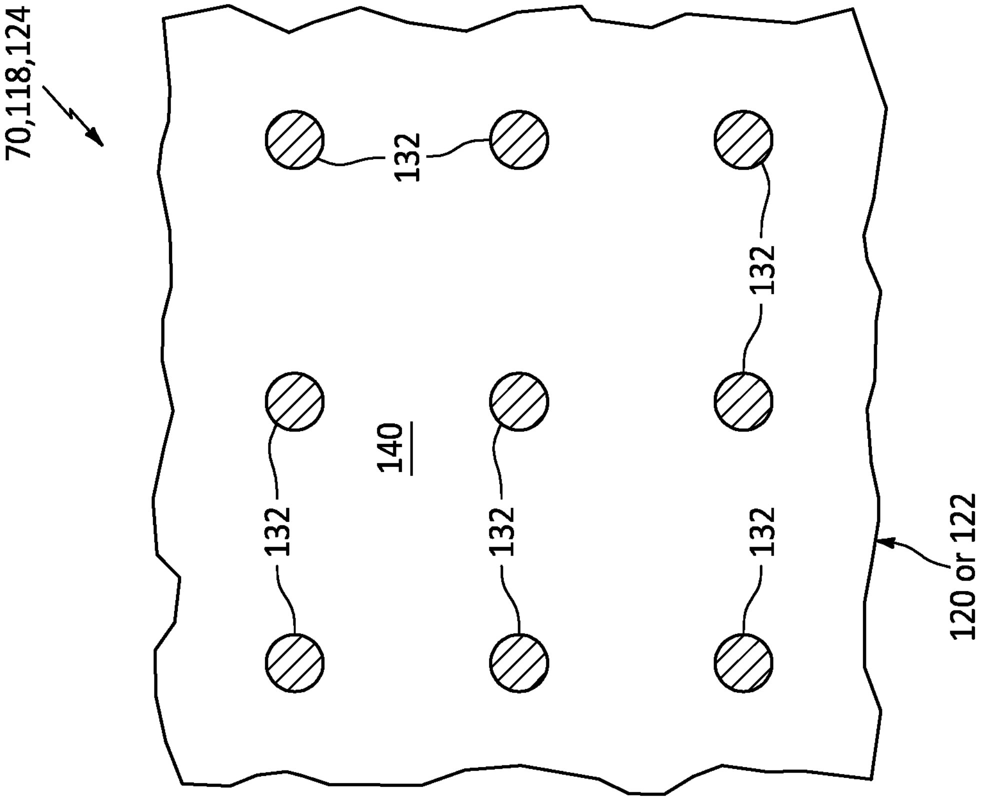

Each of the core elements 132 of FIG. 6 extends radially between and to the outer sidewall 120 and the inner sidewall 122. Each of the core elements 132 may also be connected to the outer sidewall 120 and/or the inner sidewall 122. Referring to FIG. 8A, each of these core elements 132 may be configured as a point protrusion 134 such as, but not limited to, a column or pedestal. Referring to FIG. 8B, one or more or all of the core elements 132 may also or alternatively be configured as an elongated protrusion 136 such as, but not limited to, a rail or a wall. Referring to FIGS. 9A and 9B, at least a portion or an entirety of each core element 132 may be laterally and/or longitudinally spaced from (e.g., any) neighboring (e.g., adjacent) core elements 132. Each core element 132 of FIGS. 9A and 9B may thereby be isolated from/disengaged from the other neighboring core elements 132. Alternatively, referring to FIG.

Figure 9C:
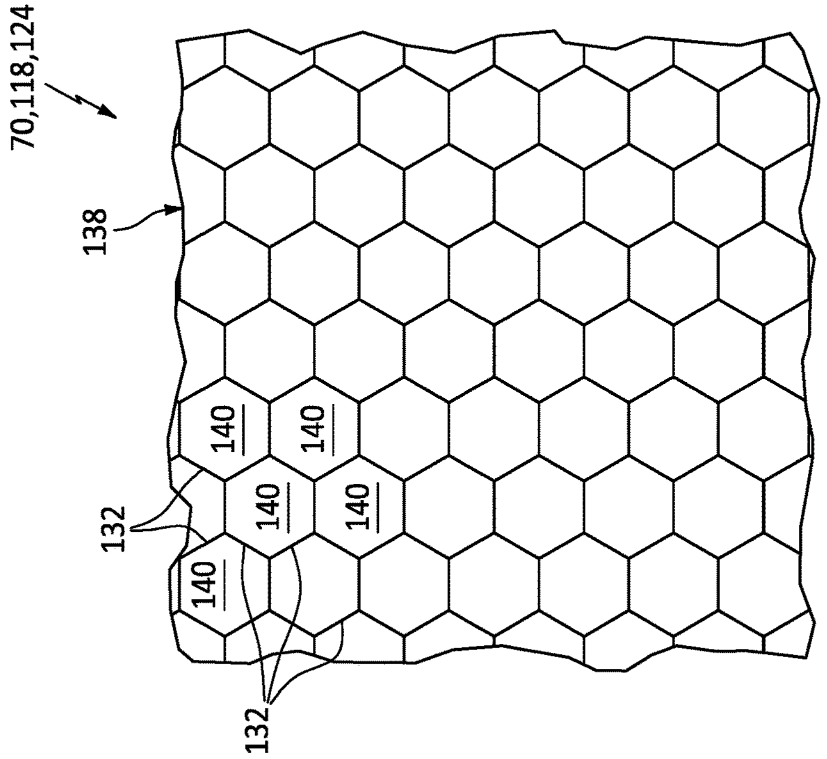

9C, one or more of the core elements 132 may be laterally and/or longitudinally engaged. The core elements 132 of FIG. 9C may thereby be interconnected and form a lattice structure. The cellular core 124 of FIG. 9C, for example, may be configured as a honeycomb core 138.

Referring to FIG. 6, the spacing between the core elements 132 provides the cellular core 124 with one or more (e.g., internal) cells 140; e.g., cavities, channels or other apertures. One or more or all of these cells 140 may be a closed cell where, for example, the cells 140 are fluidly discrete. Some or all of the cells 140 may also or alternatively be an open cell where, for example, those cells 140 are fluidly coupled (e.g., interconnected) with one another. Each cell 140 of FIG. 6 extends (e.g., laterally and/or longitudinally) between neighboring core elements 132. Each cell 140 of FIG. 6 extends radially through the cellular core 124 between and to the outer sidewall 120 and the inner sidewall 122. The outer sidewall 120 and the inner sidewall 122 may thereby enclose (e.g., cap off) outer and inner ends of each cell 140. However, in other embodiments, it is contemplated one or more of the cells 140 may alternatively extend radially through the cellular structure 118 to orifices in the spacer outer surface 110 and/or to orifices in the spacer inner surface 108.

Figure 10:
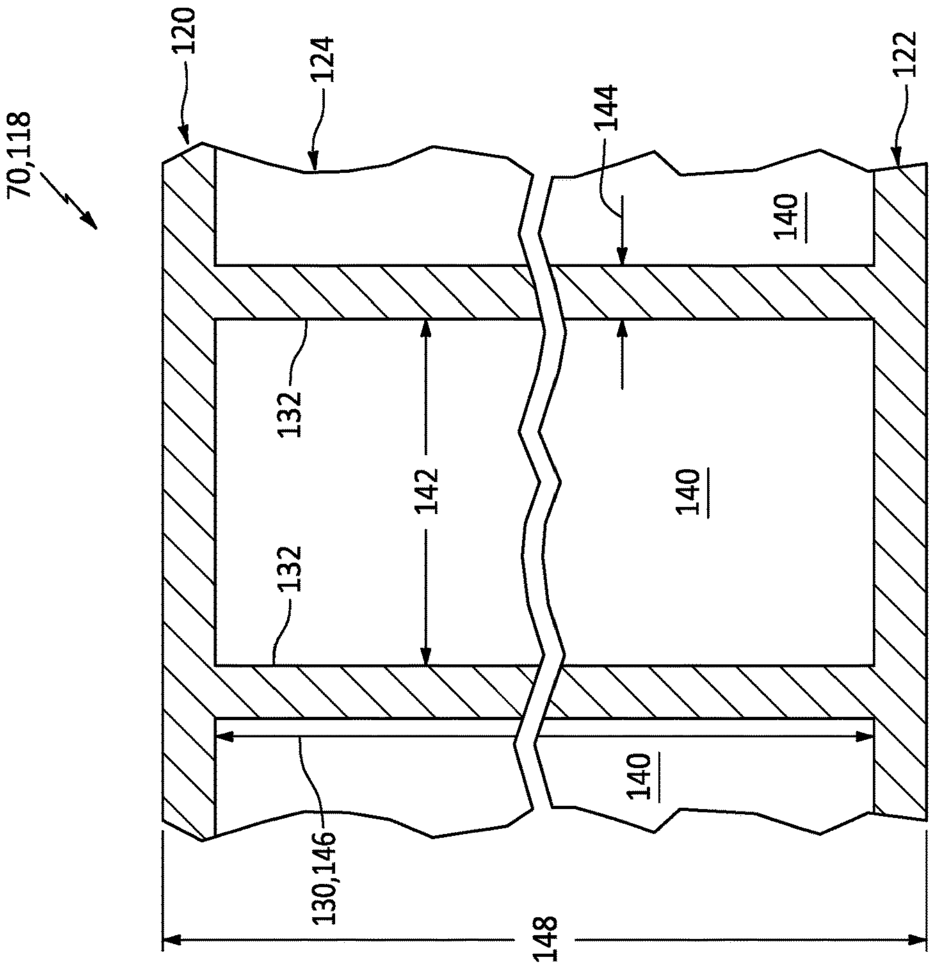
FIG. 10 is a sectional illustration of a portion of the root spacer.

Referring to FIG. 10, each cell 140 has a lateral width 142. This lateral width 142 may be sized greater than a lateral thickness 144 of an adjacent one of the core elements 132. The lateral width 142, however, may be sized smaller than a radial height 146 of that respective cell 140. The lateral width 142 may also or alternatively be sized smaller than a radial thickness 148 of the root spacer 70 and its cellular structure 118 at (e.g., on, adjacent or proximate) the respective cell 140. Furthermore, while the lateral width 142 may be uniform (e.g., constant) radially, laterally and/or longitudinally across the root spacer 70 and its cellular core 124, the lateral width 142 may alternatively continuously or incrementally change (e.g., increase, decrease and/or undulate) radially, laterally and/or longitudinally across the root spacer 70 and its cellular core 124. The lateral width 142, for example, may be locally sized to tailor a root spacer impact response. The present disclosure, however, is not limited to the foregoing exemplary dimensional relationships.

Figure 11:
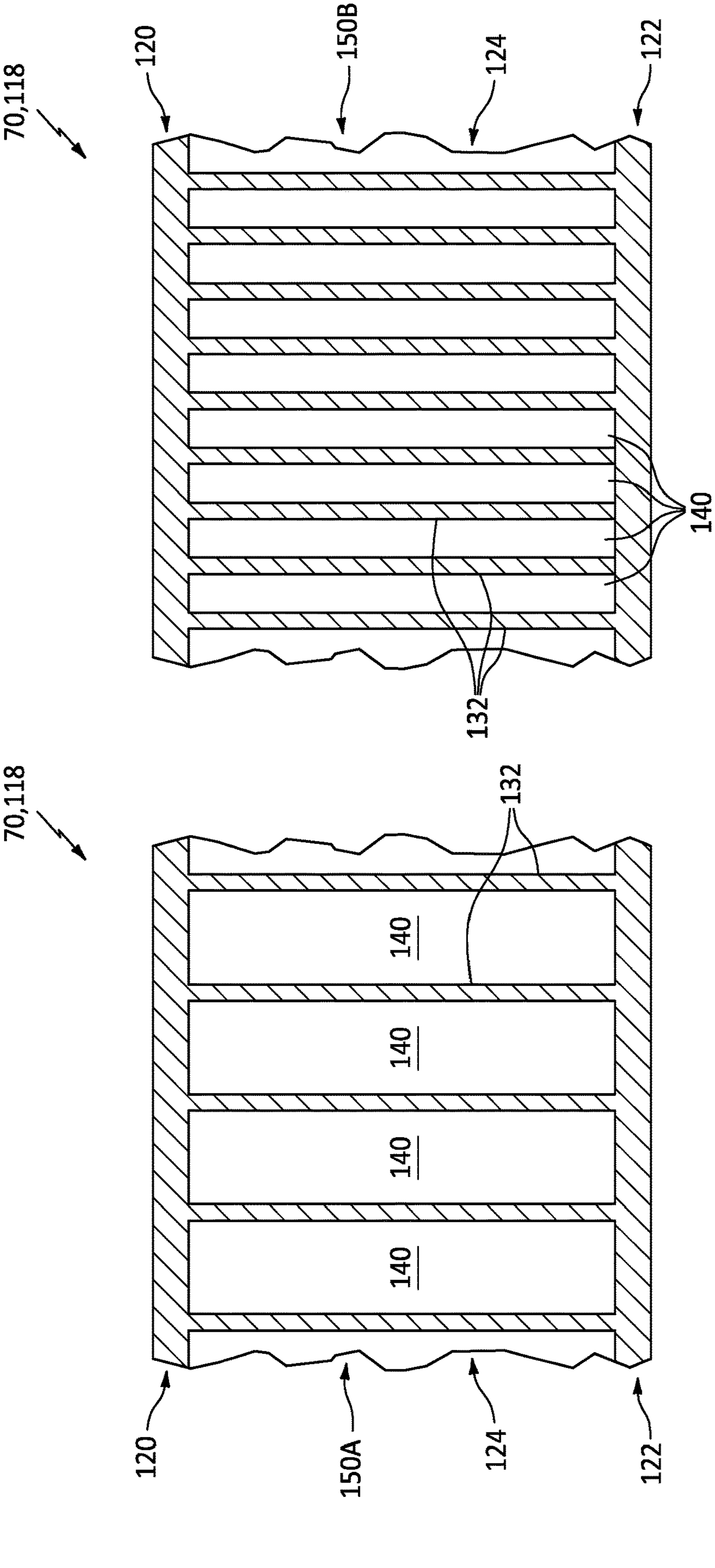
FIG. 11 is a sectional illustration of portions of the same root spacer with different porosities.

Referring to FIG. 6, the cellular structure 118 and its cellular core 124 may have a uniform (e.g., constant) porosity longitudinally, laterally and/or radially across the root spacer 70. Here, the term "porosity" may describe a ratio of empty volume (e.g., associated with the cell(s) 140) to filled volume (e.g., associated with the core elements 132). Alternatively, referring to FIG. 11, the cellular structure 118 and its cellular core 124 may include a plurality of portions 150A and 150B (generally referred to as "150") with different porosities. These different porosity portions 150 may be arranged longitudinally, laterally and/or radially across the root spacer 70. The different porosity portions 150 may be arranged to tailor root spacer deformation to more effectively damp certain types of impacts against the respective rotor blade 68 (see FIG. 6).

In some embodiments, referring to FIG. 6, each core element 132 (e.g., core wall) may have a common (e.g., the same) thickness 151. In other embodiments, the core element thickness 151 may be different (e.g., larger or smaller) for one or more of the core element 132 than one or more other of the core element 132. The core element thicknesses 151, for example, may be locally sized to tailor a root spacer impact response.

Figure 13:
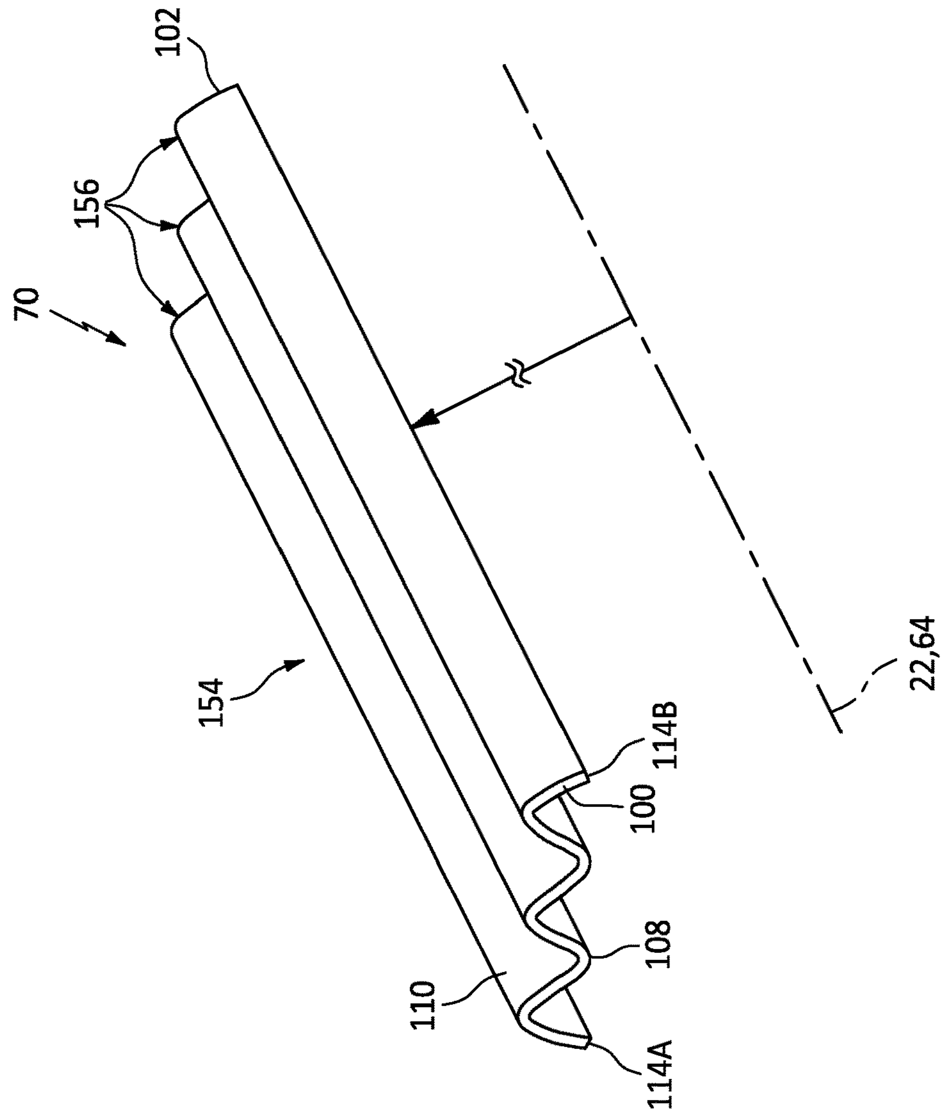
FIG. 13 is a perspective illustration of a root spacer with a corrugated geometry.
Figure 12:
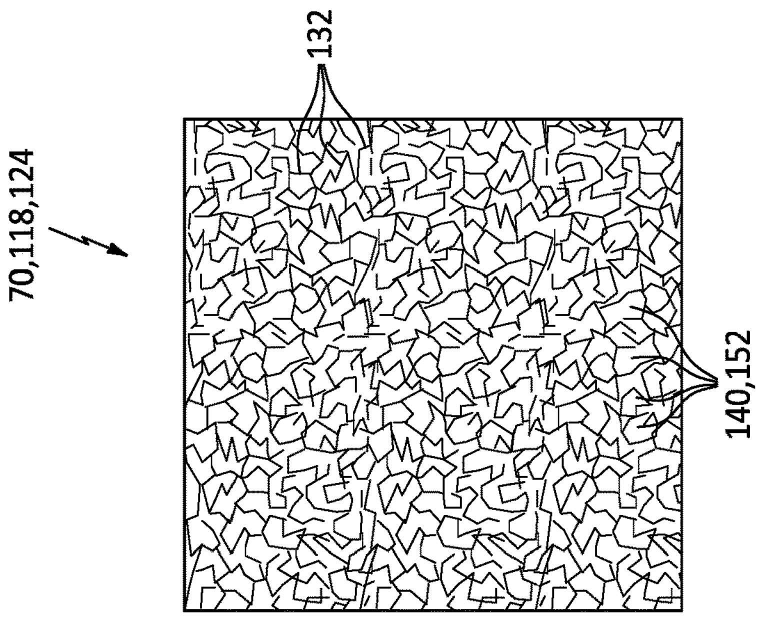
FIG. 12 is a sectional illustration of a portion of the root spacer formed from porous material.

In some embodiments, referring to FIG. 6, the cellular structure 118 may be or otherwise include an engineered structure such as the cellular core 124 described above. In other embodiments, referring to FIG. 12, at least a portion or the entire cellular structure 118 (or the cellular core 124) may be formed from material with integral (e.g., internal) cells 140. The cellular structure 118 of FIG. 12, for example, is formed from or may otherwise include a foam or other porous material with integral internal pores 152. Each of these pores 152 may form a respective one of the cells 140. The material forming the pores 152 may form the deformable elements 132. In still other embodiments, referring to FIG. 13, at least a portion or the entire cellular structure 118 (or the cellular core 124) may be replaced with a corrugated body 154. This corrugated body 154 may provide the root spacer 70 with a corrugated geometry in a reference plane, for example, perpendicular to the rotational axis 64. The corrugated body 154 of FIG. 13, for example, includes plurality of corrugations 156 arranged laterally between the spacer sides 114. Each of these corrugations 156 may extend longitudinally between the spacer ends 100 and 102.

In some embodiments, the root spacer 70 may be formed from a single material. In other embodiments, the root spacer 70 may be formed from multiple materials, where the different materials are selectively placed to enhance/tune the deformation. Examples of root spacer materials include, but are not limited to, metal (e.g., aluminum (Al), titanium (Ti) and/or alloys thereof) and composite material (e.g., fiber-reinforced polymer). The present disclosure, however, is not limited to the foregoing exemplary materials.

The rotor assembly 62 and/or its root spacers 70 may be included in various gas turbine engines other than the one described above. The rotor assembly 62 and/or its root spacers 70, for example, may be included in a geared gas turbine engine where a geartrain connects one or more shafts to one or more rotors in a fan section, a compressor section and/or any other engine section. Alternatively, the rotor assembly 62 and/or its root spacers 70 may be included in a direct drive gas turbine engine configured without a geartrain. The rotor assembly 62 and/or its root spacers 70 may be included in a gas turbine engine configured with a single spool, with two spools (e.g., see FIG. 1), or with more than two spools. The gas turbine engine may be configured as a turbofan engine, a propfan engine, a pusher fan engine or any other type of gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A rotor assembly, comprising:
- a rotor disk including a slot;
- a rotor blade including a blade root arranged within the slot; and
- a root spacer arranged within the slot radially between the rotor disk and the blade root, the root spacer comprising a cellular structure with a plurality of internal cells;
- the cellular structure including a first sidewall, a second sidewall and cellular core radially between and connected to the first sidewall and the second sidewall, the first sidewall engaging the blade root and overlapping the plurality of internal cells, and the second sidewall engaging the rotor disk and overlapping the plurality of internal cells; and the cellular core including a plurality of core elements extending radially between the first sidewall and the second sidewall, each of the plurality of internal cells formed by and between a respective neighboring pair of the plurality of core elements, and an entirety of each of the plurality of core elements spaced from a respective neighboring one or more of the plurality of core elements.

2. The rotor assembly of claim 1, wherein the plurality of internal cells comprise a plurality of closed cells.

3. The rotor assembly of claim 1, wherein the plurality of internal cells comprise a plurality of open cells.

4. The rotor assembly of claim 1, wherein a first of the plurality of core elements comprises a column.

5. The rotor assembly of claim 1, wherein a first of the plurality of core elements comprises a rail.

6. The rotor assembly of claim 1, wherein at least one of the first sidewall is non-perforated; or the second sidewall is non-perforated.

7. The rotor assembly of claim 1, wherein a first portion of the cellular structure has a first porosity; and a second portion of the cellular structure has a second porosity that is different than the first porosity, and the first portion and the second portion are arranged laterally across the root spacer.

8. The rotor assembly of claim 1, wherein the root spacer is radially between the rotor disk and the blade root;

the root spacer has a radial thickness at a first of the plurality of internal cells; and the first of the plurality of internal cells has a lateral width that is less than the radial thickness.

9. The rotor assembly of claim 1, wherein the root spacer is radially between the rotor disk and the blade root; and a first of the plurality of internal cells has a radial height and a lateral width that is less than the radial height.

10. The rotor assembly of claim 1, wherein the rotor blade comprises a gas turbine engine fan blade.

11. The rotor assembly of claim 1, wherein the slot is one of a plurality of slots that extend longitudinally into the rotor disk;

the rotor blade is one of a plurality of rotor blades that are arranged circumferentially around an axis, and each of the plurality of rotor blades includes a respective blade root that is arranged within a respective one of the plurality of slots; and the root spacer is one of a plurality of root spacers, and each of the plurality of root spacers is arranged within a respective one of the plurality of slots between the rotor disk and the respective blade root.

12. The rotor assembly of claim 1, wherein a first portion of the cellular structure has a first porosity; and a second portion of the cellular structure has a second porosity that is different than the first porosity, and the first portion and the second portion are arranged longitudinally along the root spacer.

13. The rotor assembly of claim 1, wherein a first portion of the cellular structure has a first porosity; and a second portion of the cellular structure has a second porosity that is different than the first porosity, and the first portion and the second portion are arranged radially across the root spacer.

* * * * *